United States Patent
Baldwin

(10) Patent No.: US 10,200,599 B1
(45) Date of Patent: Feb. 5, 2019

(54) IMAGE CAPTURE SETTING DETERMINATION IN DEVICES HAVING ACCESS TO MULTIPLE CAMERAS

(71) Applicant: QUALCOMM Incorporated, San Diego, CA (US)

(72) Inventor: Cullum James Baldwin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/697,977

(22) Filed: Sep. 7, 2017

(51) Int. Cl.
  *H04N 5/232* (2006.01)
  *G06T 7/00* (2017.01)
  *G06T 7/80* (2017.01)
  *H04N 5/235* (2006.01)

(52) U.S. Cl.
  CPC ......... *H04N 5/23216* (2013.01); *G06T 7/80* (2017.01); *G06T 7/97* (2017.01); *H04N 5/2352* (2013.01)

(58) Field of Classification Search
  CPC .................................................. H04N 5/23216
  USPC ...................................................... 348/222.1
  See application file for complete search history.

(56) References Cited

U.S. PATENT DOCUMENTS

2014/0211041 A1* 7/2014 McCrackin ............ H04N 9/735
  348/223.1

* cited by examiner

*Primary Examiner* — Joel W Fosselman
(74) *Attorney, Agent, or Firm* — QUALCOMM Incorporated

(57) ABSTRACT

Methods, devices, and systems for determining one or more image capture settings are disclosed. In some aspects a device includes a processor coupled to a first camera and a second camera. In one aspect, the device may include the first camera and the second camera. The processor is configured to cause the first camera to capture a first image frame and cause the second camera to capture a second image frame. The second image frame being captured at a point in time after the first image frame is captured. The processor is also configured to determine an image capture setting for the first camera based on the second image frame.

28 Claims, 11 Drawing Sheets

IMAGE CAPTURE SETTING DETERMINATION IN DEVICES HAVING ACCESS TO MULTIPLE CAMERAS

BACKGROUND

Field

This disclosure relates generally to determining image capture settings in devices having access to more than one camera. As one example, this disclosure relates to automated techniques for determining exposure control, focal distance, and/or white balance settings that may be applied to capture an image frame of a scene.

Background

Some electronic devices include, or are coupled to, two or more cameras capable of capturing image frames and/or video (e.g., a sequence of image frames). In such devices, each camera can include its own associated lens and/or sensor, and each camera can be independently controlled. As a result, image frames captured by separate cameras in a multiple camera device can differ in terms of field-of-view, spatial resolution, pixel intensity, and/or color, for example. These differences in camera parameters can be utilized to provide certain improvements in user experience and/or image capture quality as compared to at least some electronic devices that include, or have access to, only a single camera. For example, devices having differently configured cameras can be used to capture an extended range of zoom as compared to some devices that include only a single camera.

SUMMARY

Aspects of the present disclosure are directed to methods and devices for determining image capture settings for one or more cameras. In one aspect a device includes a processor coupled to a first camera and a second camera. The processor is configured to cause the first camera to capture a first image frame and cause the second camera to capture a second image frame, the second image frame being captured after the first image frame. The processor is also configured to determine an image capture setting for the first camera based on the second image frame. In some aspects, the device can include the first camera and/or the second camera. In some aspects, the processor can be configured to cause the first camera to capture a third image frame based on the determined image captured setting, which can include, for example, an exposure control setting, a white balance setting, and/or a focal distance setting.

In some aspects, the processor can also be configured to cause the first camera to capture one or more image frames including the first image frame at a first frame rate and to cause the second camera to capture one or more image frames including the second image frame at a second frame rate. In some aspects, the first frame rate can be equal to the second frame rate. In other aspects, the second frame rate can be less than the first frame rate. In even other aspects, the second frame rate can be greater than the first frame rate. The first frame rate can be a default frame rate for the first camera. In some aspect, the second frame rate can be adjusted based on an estimated rate of change of one or more scene conditions.

In some aspects a sensor of the first camera can differ from a sensor of the second camera in at least one of spatial resolution and color responsivity. In some aspects the field-of-view of the first camera can be different than a field-of-view of the second camera.

In some aspects, the processor can be configured to cause the second camera to capture the second image frame in response to a change in one or more scene conditions. The change in scene conditions can be determined based on two or more image frames captured by the first camera and/or based on data received from a light sensor, for example. In some aspects, determining the image capture setting for the first camera can include comparing the first image frame to the second image frame and determining the image capture setting based on the second image frame in response to a difference between the first image frame and the second image frame exceeding a threshold value. The comparing can include, for example, comparing lux values, color temperature values, and/or focal distance values.

In some aspects the processor can determine the image capture setting for the first camera by mapping an image capture setting for the second camera based on the second image frame to an image capture setting for the first camera. The mapping can include comparing values corresponding to the first camera to values corresponding to the second camera in a lookup table. In another aspect, the mapping can include applying a theoretical model relating an image capture setting of the second camera to an image capture setting of the first camera. In some aspects, the processor can be configured to estimate a rate of change of one or more scene conditions based on the first image frame and the second image frame. The image capture setting determined for the first camera can be based on the estimated rate of change. The device can optionally include a controller coupled to the processor and the first camera and/or second camera. In some implementations the controller can directly cause the first camera and/or second camera to capture an image frame based on input received from a user without receiving an instruction from one or more processors coupled to the controller. In some aspects, the image capture setting for the first camera can be based on the first image frame and the second image frame.

In another aspect, a method is disclosed. The method includes causing a first camera to capture a first image frame and causing a second camera to capture a second image frame, the second image frame being captured after the first image frame. The method also includes determining an image capture setting for the first camera based on the second image frame. In some aspects, the method can include causing the first camera to capture a third image frame based on the determined image captured setting, which can include, for example, an exposure control setting, a white balance setting, and/or a focal distance setting.

In some aspects, the method can also including causing the first camera to capture one or more image frames including the first image frame at a first frame rate and causing the second camera to capture one or more image frames including the second image frame at a second frame rate. In some aspects, the first frame rate can be equal to the second frame rate. In other aspects, the second frame rate can be less than the first frame rate. In even other aspects, the second frame rate can be greater than the first frame rate. The first frame rate can be a default frame rate for the first camera. In some aspect, the method can include adjusting the second frame rate based on an estimated rate of change of one or more scene conditions.

In some aspects, the method can include causing the second camera to capture the second image frame in response to a change in one or more scene conditions. The method can include determining the change in scene conditions based on two or more image frames captured by the first camera and/or based on data received from a light sensor, for example. In some aspects, determining the image capture setting for the first camera can include comparing the first image frame to the second image frame and determining the image capture setting based on the second image frame in response to a difference between the first image frame and the second image frame exceeding a threshold value. The comparing can include, for example, comparing lux values, color temperature values, and/or focal distance values.

In some aspects determining the image capture setting for the first camera can include mapping an image capture setting for the second camera based on the second image frame to an image capture setting for the first camera. The mapping can include comparing values corresponding to the first camera to values corresponding to the second camera in a lookup table. In another aspect, the mapping can include applying a theoretical model relating an image capture setting of the second camera to an image capture setting of the first camera. In some aspects, the method can include estimating a rate of change of one or more scene conditions based on the first image frame and the second image frame. The image capture setting determined for the first camera can be based on the estimated rate of change.

In another aspect, a non-transitory computer-readable storage medium is disclosed. The non-transitory computer-readable storage medium stores instructions that, when executed, cause one or more processors to cause a first camera to capture a first image frame, cause a second camera to capture a second image frame after the first image frame is captured, and determine an image capture setting for the first camera based on the second image frame.

In another aspect, a device is disclosed. The device may include means for causing a first camera to capture a first image frame and means for causing a second camera to capture a second image frame. The second image frame can be captured after the first image frame. The device may also include means for determining an image capture setting for the first camera based on the second image frame.

The details of one or more examples are set forth in the accompanying drawings and the description below. Other features, objects, and advantages will be apparent from the description, drawings, and claims.

DETAILED DESCRIPTION

Figure 1A:
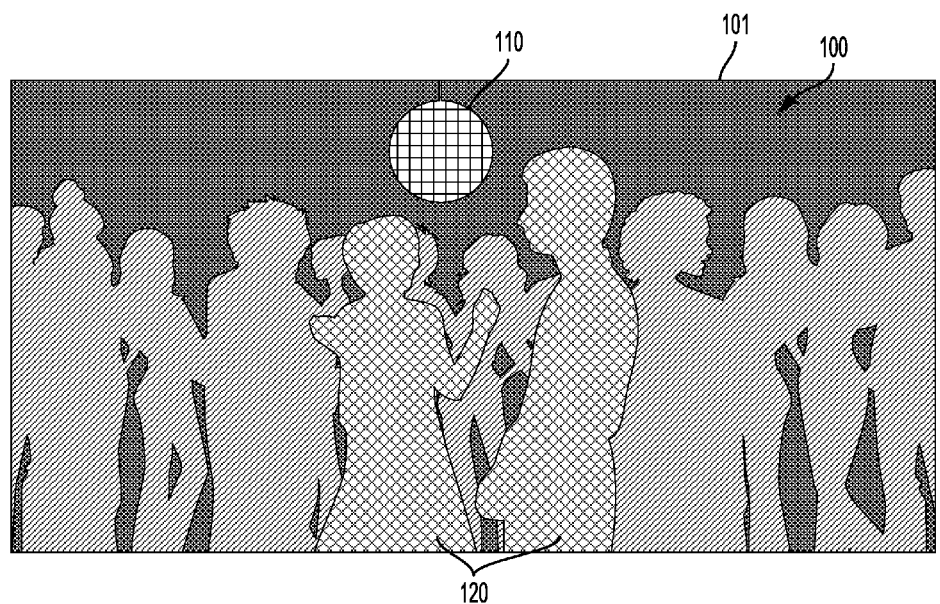
FIGS. 1A-1D depict example image frames captured in different points in time of a scene experiencing changes in lighting conditions.

Electronic devices including, or having access to image data from, two or more cameras ("multiple camera devices") can address certain limitations of devices including only a single camera. For example, in electronic devices having limited form factors such as mobile phones, tablets, and/or wearable devices, the total track length of a camera lens is constrained based on a maximum depth or z-height dimension of the form factor. In many of these devices, it can be desirable to minimize the depth or z-height to provide a thin, less bulky device. As a result, a range of effective zoom for a device having only one camera can be limited based on form factor design constraints. In multiple camera devices, the range of effective zoom for the multiple camera module can be extended without increasing an overall depth or z-height dimension of a camera module by switching between two or more cameras having differing fields-of-view, optics, and/or sensor sizes. For example, a device can include first camera with a first field-of-view ("FOV") and a second camera with a second FOV that is narrower than the first FOV. In this way, image capture operations (e.g., image preview on a display and/or video capture) can use the first camera to provide image data for a scene and the second camera to provide image data for a zoomed-in portion of the scene.

Another example limitation of some single camera devices with limited form factors is a constraint in aperture size, which can affect light intake and depth-of-focus. Those having skill in the art will appreciate the tradeoffs in aperture size with relatively smaller apertures resulting in lower light intake and larger depth-of-focus than relatively larger apertures. In contrast, multiple camera devices can be configured to combine image data captured from different cameras to augment pixel intensity values and/or reduce noise. For example, some electronic devices can be provisioned with a first camera having an image sensor where different pixels are responsive to different colors of light (e.g., a Bayer sensor) and a second camera having a sensor having pixels responsive to all light (e.g., a mono sensor). Such devices can be configured to reduce noise and improve sharpness in low light conditions as compared to single camera devices by stacking overlapping portions of image frames from each camera that are correlated in time and adjusting signal values for color pixel values based on the image data from the mono sensor.

A single camera device with a restricted aperture size (e.g., a camera on a mobile phone, tablet, head-mounted display, watch, etc.) is also not able to adequately adjust a depth-of-field in certain scenes since the upper bound of the aperture is restricted. Additionally, such devices typically do not include adjustable apertures due to space and technical limitations. However, devices with two or more cameras having relatively small, fixed apertures can be used to generate a simulated depth-of-field effect or a simulated Bokeh effect via a depth map. For example, a depth map may be generated in such devices based on the offset of a pixel in a first image captured by a first camera relative to a corresponding pixel in a second image captured by a second camera (e.g., depth from pixel disparity values). The resulting depth map can be used for several purposes including, for example, a simulated depth-of-field adjustment or a simulated Bokeh effect. Such adjustments or effects can be applied artistically on larger and/or more expensive single camera devices (e.g., digital single-lens reflex ("DSLR") cameras) that use a large, adjustable aperture to create a narrow depth-of-field. This effect is commonly used for portraiture or other scenes where it may be desirable to accentuate one or more foreground objects of interest. In multiple camera devices, this effect can be generated in preview mode and/or applied to captured image frames by applying a depth-of-field blur to an image frame captured by a single camera based on an associated depth map derived using two or more cameras.

From these examples, it can be appreciated that there are many options and available configurations for multiple camera devices. It can also be appreciated that the configuration of the multiple cameras can be selected to address certain limitations in single camera devices, especially single camera devices that require a relatively small form factor.

Some techniques for estimating image capture settings such as automatic exposure control ("AEC"), automatic focus ("AF"), and/or an automatic white balance ("AWB") use data from image frames (or "images") previously captured by a camera to estimate one or more settings for an upcoming frame to be captured by the same camera. In one example, an image capture setting for an upcoming image frame can be estimated based on image data of an immediately preceding frame captured by the same camera. Without additional information, the response to scene changes that may affect these settings is limited by the frame rate of the camera since the frame rate correlates to the sampling rate for the rate of change in the scene. For example, a camera capturing image frames at a rate of 30 frames per second ("fps") will only estimate image capture settings such as AEC, AF, and/or AWB up to 30 times per second. As a result, this means that the applied settings based on these estimates may not be appropriate when conditions in the scene change more frequently than the frame rate and corresponding image setting determination frequency (e.g., scene rate of change sampling frequency). For example, in scenes with strobe lighting or "disco" lighting such as scenes of concerts, night clubs, bars, roller skating rinks, etc., an image capture setting applied based on an estimate from a previous image frame may not be suitable for the scene at the time of capture because of a change in lighting conditions such as intensity of light incident on the scene and/or color temperature variation of the light incident on the scene. In another example, scene changes that may affect one or more image capture settings such as AF may include motion by one or more objects in the scene and/or motion of the camera itself. In this way, it can be understood that the responsiveness of a device to changes in scene conditions ("device frequency response") can be limited by the frame rate or frame sampling rate that is used to determined image capture settings that are applied when capturing subsequent image frames.

Turning now to FIG. 1A, an example image frame 101 of a scene 100 is schematically illustrated. The scene 100 includes a dynamic lighting element 110. As shown, the dynamic lighting element 110 can be a disco ball. It will be understood by those having skill in the art that the dynamic lighting element 110 can be any light emitting and/or altering device capable of dynamically changing lighting conditions of a scene at a relatively high frequency, for example, greater than once per second, five times per second, ten times per second, twenty times per second, or thirty times per second. In some examples, the dynamic lighting element 110 can alter an overall color temperature of light incident on a scene and/or affect a color temperature of light directed to one or more portions of the scene such as a foreground object or background. The dynamic lighting element 110 can also alter the intensity or photometric luminance of light incident on a scene and/or discrete portions of the scene.

In FIG. 1A, the image frame 101 includes foreground subjects 120 that are underexposed due to an image capture setting (e.g., AEC and/or AWB setting) that was determined based on image data related to a image frame that was captured previously at a moment when more light was present in the scene than when the image frame 101 that was captured.

Figure 1B:
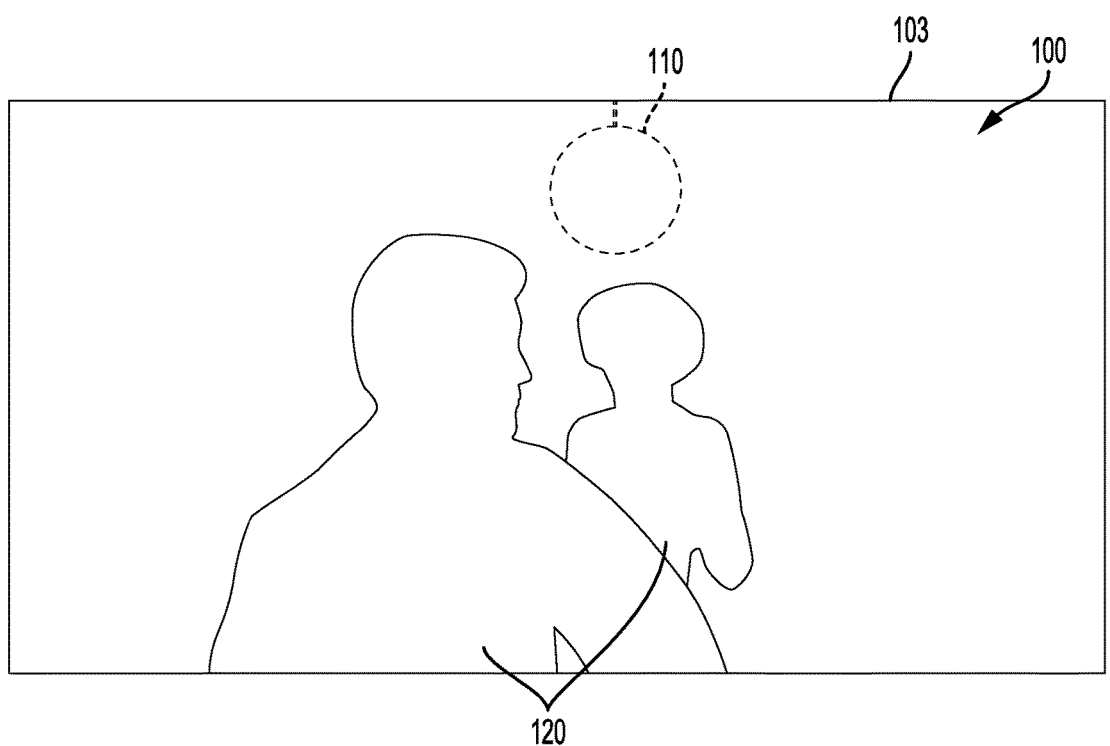

FIG. 1B depicts an example image frame 103 of scene 100 captured immediately following the example image frame 101 of FIG. 1A. In FIG. 1B the dynamic lighting element 110 has reduced the intensity of light incident on the scene as compared to the moment that image frame 101 was captured. As a result, the foreground subjects 120 in image frame 103 are overexposed because the image capture settings applied to capture the image frame 103 were based on the lighting conditions of the scene at the moment image frame 101 of FIG. 1A was captured. Thus, the image capture settings did not account for the lighting condition change that occurred after the settings were estimated. Of course, the overexposure or underexposure of foreground subjects is often not desirable when capturing an image of a scene.

Figure 1C:
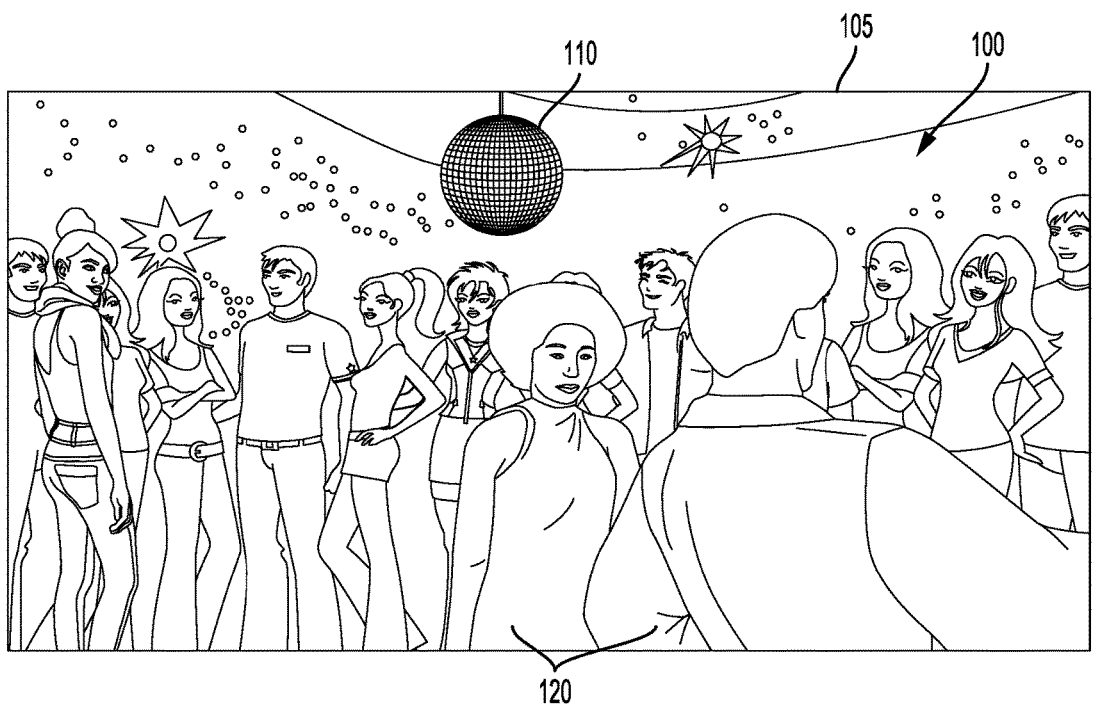

FIG. 1C depicts an example image frame 105 of scene 100 with foreground subjects 120 that are correctly exposed. In this example, although the lighting conditions of the scene 100 may be changing rapidly due to the dynamic lighting element 110, the image capture settings applied to capture the image frame 105 depicted in FIG. 1C were coincidentally appropriate because the lighting conditions at the time the image capture settings were estimated (e.g., based on image frame 103) were similar to the conditions present in the scene at the time image frame 105 was captured. However, as depicted, the subjects in the foreground are not smiling and/or looking at the camera.

FIGS. 1A-1C depict the complexity in capturing desirable images in scenes with dynamic lighting conditions that may frustrate users and/or limit opportunities to capture moments of interest in environments where lighting conditions and optionally subject poses are dynamic FIGS. 1A and 1B illustrate examples where image capture settings related to light intensity or luminance were not appropriate for the scene. However, it should be understood that other example lighting changes may also result in reduced quality of captured image frames. For example, when color temperature changes in a scene there is a risk that AWB settings based on an image frame captured before the change occurred would result in colors in the image being saturated or muted. Further, while FIG. 1A depicts a scene 100 undergoing changes in lighting conditions applied by dynamic lighting element 110, it will be understood that other scene changes, for example, motion of one or more subjects and/or of a device used to capture image frame 101, may result in one or more image capture settings that were determined based on an earlier image frame being inappropriate for the scene at the time of capture. For example, motion in the scene 100 and/or exhibited by the capture device may result in an applied AF setting that is not appropriate for the scene 100 at the time of capture (due to the motion of a foreground subject subsequent to the AF setting determination, for example). Example scenes where high rates of motion may be present include nature scenes (e.g., hummingbirds, bumblebees, etc.), air show scenes (e.g., scenes with aircraft), amusement park scenes (e.g., scenes with rollercoasters or other fast moving attractions), and scenes with automobiles (e.g., stock car races, drag car races, freeway driving scenes). Those having skill in the art will appreciate that the techniques disclosed herein are, of course, applicable to other types of scenes than the examples provided.

Figure 1D:
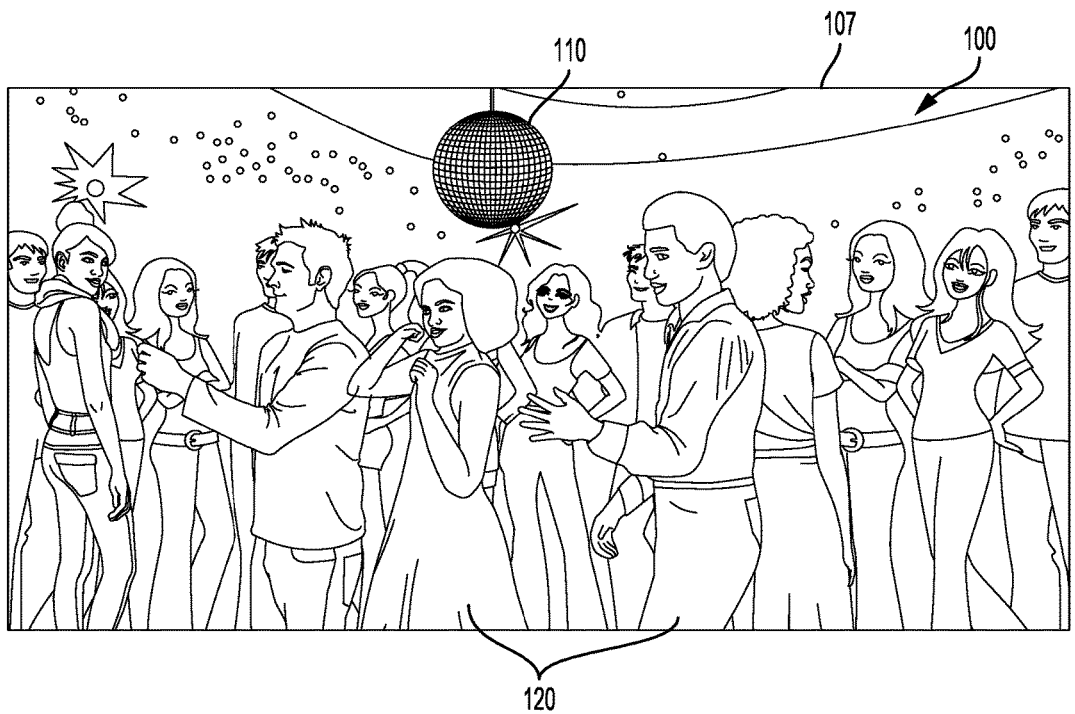

Turning now to FIG. 1D, an example image frame 107 of scene 100 with foreground subjects that are correctly exposed and desirably posed is schematically depicted. In this example, the image capture settings utilized to capture image frame 107 were appropriate for the lighting conditions of the scene 100 and the subjects 120 are acceptably posed and in focus. For example, the faces of the subjects 120 are visible and they are smiling. The opportunity to capture an acceptable image similar to image frame 107 in a scene with dynamic lighting conditions or motion in the scene can be enhanced by practicing one or more of the techniques disclosed herein. As a result, a user experience can be improved by providing a device that is more reliably capable of capturing images as intended to be captured by the user.

As discussed in further detail below, some aspects of the present disclosure can be applied, for example, to improve quality of captured image frames in scenes experiencing relative motion and/or dynamic lighting changes by using information from more than one camera to increase a sampling rate used to determine an image capture setting to apply when capturing an upcoming image frame. In some implementations, this can be accomplished by operating a first camera at a first frame rate and a second camera at a second frame rate that is greater than the first frame rate. By considering an image capture setting for a scene determined by the second camera at a point in time subsequent to the capture of the previous image frame by the first camera, the temporal offset between image capture setting estimates and scene changes can be reduced. In other implementations, this offset can be reduced by operating a first and second camera at a common frame rate and de-synchronizing the exposure start periods. In this way, an image capture setting determined by the second camera may be based on an image frame captured by the second camera that is closer in time to the upcoming capture by the first camera than any frame captured previously by the first camera. In other implementations, three or more cameras operating at common or different frame rates can be utilized to increase an overall sampling rate of a scene rate of change as compared to relying on the frame rate of one camera.

By determining image capture settings closer in time to an associated image capture, frequency response to scene changes can be improved as compared to existing techniques. Further, the image capture settings determined from two or more cameras can provide a more granular characterization of a rate of change for lighting conditions in a scene, and this rate of change may be utilized to modulate exposure time (e.g., to account for expected lighting condition changes). This improved characterization due to an increased sampling rate can yield more accurate results in predicting scene conditions for a future frame to be captured. Additionally, the implementations disclosed herein may be advantageous as compared to techniques for determining image capture settings based on a single camera operating at a relatively high frame rate because such frame rates result in a shorter exposure period and more gain, which can increase undesired noise. Lastly, capturing frames at a relatively higher frame rate may reduce field-of-view and/or spatial resolution. Other advantages and optional operations of such implementations will be discussed below.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, terms such as "causing," "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as smartphones, tablets, laptop computers, digital cameras, web cameras, a security system, and so on) that includes, or has access to image data from, two or more cameras, and may be implemented in electronic devices having a variety of camera configurations. For example, the cameras may have similar or different capabilities (such as resolution, color or black and white, wide angle or telescopic views, same or different zoom capabilities, and so on). The cameras may also include a primary camera and one or more auxiliary cameras. While described below with respect to a device including two cameras, aspects of the present disclosure are applicable to any number of cameras and camera configurations, and are therefore not limited to two cameras (such as a dual camera device).

Figure 2A:
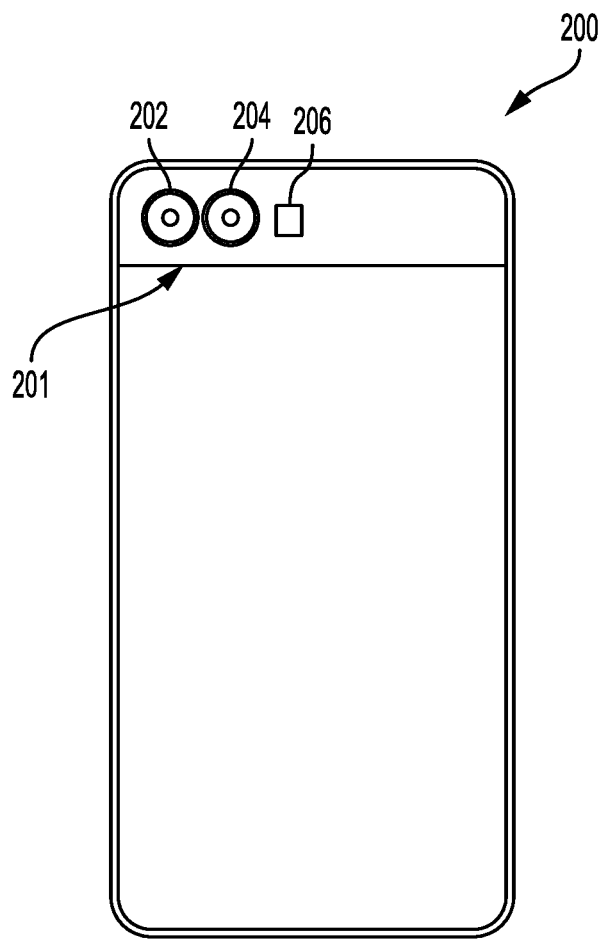
FIGS. 2A-2C depict examples of devices including multiple cameras.

FIG. 2A depicts an example device 200 including a dual camera module 201 with a first camera 202 and a second camera 204 arranged in a first configuration. In addition to the first camera 202 and the second camera 204, the device 200 includes a light sensor 206. In some implementations, the light sensor 206 can include an optical proximity sensor capable of being operated at a higher frequency than the first camera 202 and/or second camera 204 while consuming less power than the first camera 202 and/or second camera 204 would consume at this frequency.

Figure 2B:
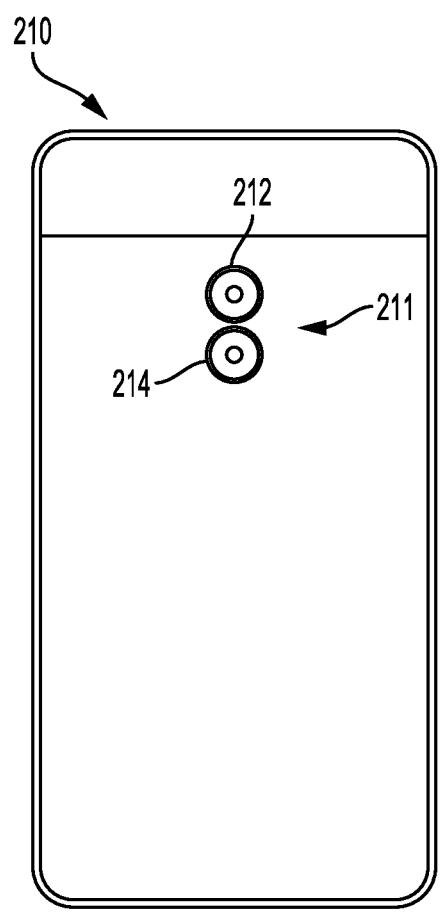

FIG. 2B depicts another example device 210 including a dual camera module 211 with a first camera 212 and a second camera 214 in a second configuration. In some aspects, one of the cameras (such as the first cameras 202 and 212) may be a primary camera, and the other camera (such as the second cameras 204 and 214) may be an auxiliary camera. Additionally or alternatively, the second cameras 204 and 214 may have a different focal distance, frame capture rate, spatial resolution, color responsivity, and/or field-of-view of capture than the first cameras 202 and 212. Although the first cameras 202, 212 and second cameras 204, 214 are depicted in FIGS. 2A and 2B as being disposed on a common side of example devices 200 and 210, it will be understood that in some implementations a first camera can be disposed so as to face a different direction than a second camera. Thus, techniques and aspects disclosed herein can be implemented using a front facing camera and a rear facing camera. Similarly, the techniques and aspects disclosed herein can be applied in devices having other camera configurations, for example, 360 capture devices having at least one camera with a field-of-view that at least partially overlaps or at least abuts a field-of-view of a second camera.

Figure 2C:
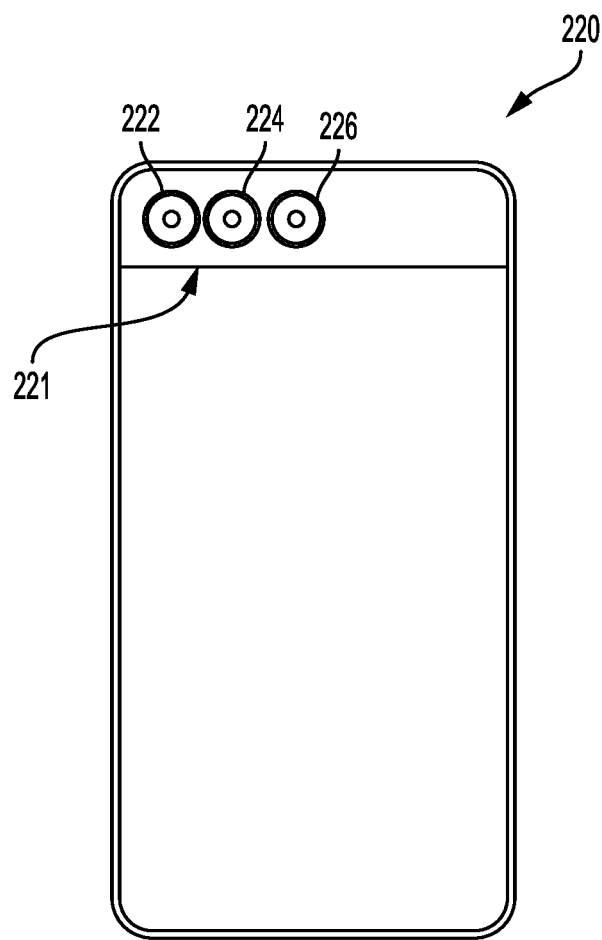

FIG. 2C depicts another example device 220 having a camera module 221 including a first camera 222, a second camera 224, and a third camera 226. In some implementations, two of the cameras, for example, the first camera 222 and the second camera 224, can be configured with different fields of view so as to provide an extended range of zoom while the third camera 226 may include a sensor responsive to white wavelengths of light to enhance color images captured by one or more of the first camera 222 and second camera 224.

Although FIGS. 2A-2C depict discrete electronic devices 200, 210, 220 each having more than one camera, the techniques disclosed herein are not limited to one or a specific number of physical objects, such as a host device for one or more cameras. Instead, multiple discrete devices may be utilized to implement at least some portions of this disclosure. For example, an image based security system with access to connected cameras that are separately located can implement aspects of the present disclosure. Similarly, as another example, a single device, such as any of the example devices 200, 210, 220 of FIGS. 2A-2C can implement aspects of the present disclosure without receiving image data from a separate device. Thus, it will be understood that while the below description and examples use the singular term "device" to describe various aspects of this disclosure, the term "device" is not limited to a specific configuration, type, or number of objects.

Figure 3:
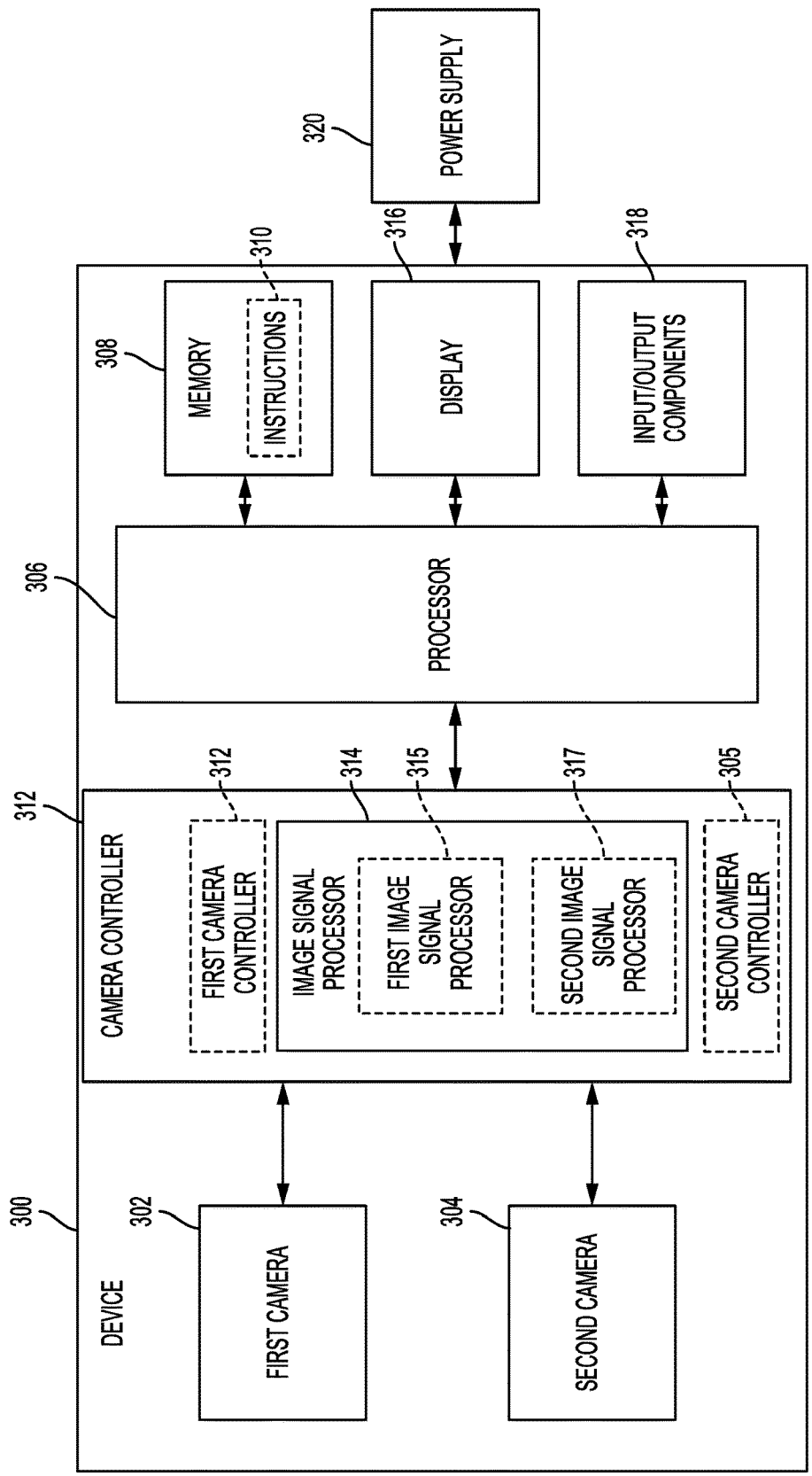
FIG. 3 is a block diagram of an example device including multiple cameras.

FIG. 3 is a block diagram of an example device 300 having multiple cameras including a first camera 302 and a second camera 304. The example device 300, which may be one implementation of the example devices 200, 210, 220 of FIGS. 2A-2C, may be any suitable device capable of capturing images and/or sequences of image (e.g., video sequences), for example, wired and wireless communication devices (such as mobile phones, smartphones, tablets, security systems, dash cameras, personal action cameras, laptop computers, desktop computers, drones, automobiles, wearable devices, head mounted displays, and so on), digital cameras (including still cameras, video cameras, and so on), or any other suitable device. In addition to the first camera 302 and the second camera 304, the example device 300 shown in FIG. 3 to include a processor 306, a memory 308 storing instructions 310, a camera controller 312, a display 316, and a number of input/output (I/O) components 318. The device 300 may include additional features or components not shown. For example, a wireless interface, which may include a number of transceivers and a baseband processor, may be included for a wireless communication device. Device 300 may include additional cameras other than the first camera 302 and the second camera 304. The disclosure should not be limited to any specific examples or illustrations, including example device 300.

The first camera 302 and second camera 304 may be capable of capturing individual image frames (such as still images) and/or capturing video (such as a succession of captured image frames). The first camera 302 and second camera 304 also may include one or more image sensors (not shown for simplicity), lenses, actuators, and/or shutters for capturing an image frame and providing the captured image frame to the camera controller 312. In some implementations the controller 312 can cause the first camera 302 and/or second camera 304 to capture one or more image frames based on an instruction received from the processor 306. In other implementations, the controller 312 can cause the first camera 302 and/or the second camera 304 to capture one or image frames without receiving an instruction from the processor 306. For example, the controller 312 can cause the first camera 302 and/or the second camera 304 to capture one or image frames based on an input received from a user without receiving an instruction from the processor 306.

The memory 308 may be a non-transient or non-transitory computer readable medium storing computer-executable instructions 310 to perform all or a portion of one or more operations described in this disclosure. The device 300 may also include a power supply 320, which may be coupled to or integrated into the device 300.

The processor 306 may be one or more suitable processors capable of executing scripts or instructions of one or more software programs (such as instructions 310) stored within memory 308. In some aspects, the processor 306 may be one or more general purpose processors that execute instructions 310 to cause the device 300 to perform any number of different functions or operations. In additional or alternative aspects, the processor 306 may include integrated circuits or other hardware to perform functions or operations without the use of software. While shown to be coupled to each other via the processor 306 in the example of FIG. 3, the processor 306, memory 308, camera controller 312, the display 316, and I/O components 318 may be coupled to one another in various arrangements. For example, the processor 306, memory 308, camera controller 312, the display 316, and/or I/O components 318 may be coupled to each other via one or more local buses (not shown for simplicity).

The display 316 may be any suitable display or screen allowing for user interaction and/or to present items (such as captured images and video) for viewing by a user. In some aspects, the display 316 may be a touch-sensitive display. The I/O components 318 may be or include any suitable mechanism, interface, or device to receive input (such as commands) from the user and to provide output to the user. For example, the I/O components 318 may include (but are not limited to) a graphical user interface, keyboard, mouse, microphone and speakers, and so on.

The camera controller 312 may include an image signal processor 314, which may include a single processing resource that is shared by the first camera 302 and the second camera 304. Optionally, the image signal processor 314 can include a first image signal processor 315 that is configured to process image data received from the first camera 302, and the image signal processor 314 can include a second image signal processor 317 that is configured to process image data received from the second camera 304. Thus, it will be understood that some configurations may include a dedicated image signal processor for each of the first camera 302 and the second camera 304, and in other configurations the first camera and the second camera 304 may be coupled to a common image signal processor 314.

In some aspects, the image signal processor 314, or optionally first image signal processor 315 and/or second image processor 317, may execute instructions from a memory (such as instructions 310 from memory 308 or instructions stored in a separate memory coupled to the image signal processor 314) to control operation of the cameras 302 and 304. In other aspects, the image signal processor 314 may include specific hardware to control operation of the cameras 302 and 304. The image signal processor 314 may alternatively or additionally include a combination of specific hardware and the ability to execute software instructions. Moreover, in other implementations, the camera controller 312 can include a first camera controller 303 configured to control the first camera 302, and a second camera controller 305 configured to control the second camera 304. In this way, the first and second cameras 302, 304 can be controlled by a single controller module and/or by separate controller modules disposed within the camera controller 312.

In some example implementations, the camera controller 312 may receive instructions from the processor 306 and control operation of the first camera 302 and the second camera 304, and/or operation of the image signal processor 314 (or first and second image signal processors 315 and 317). For example, the processor 306 may receive image frame data processed by the image signal processor 314 and determine one or more image capture settings including AEC, AF, and AWB settings for an upcoming frame based on the received image frame data. Based on the determined image capture settings, the processor 306 may provide instructions to the camera controller 312. These instructions may include camera settings to be applied by the first camera 302 and/or second camera 304 such as exposure, sensor gain, etc., and may include digital image processing instructions to be applied by the image signal processor 314.

Prior to capturing image data, it is useful to estimate or determine image capture settings. Example image capture settings may include an AEC setting, an AWB setting, an AF setting, whether to use flash, what frame rate should be applied, and so on. Irrespective of the number of cameras present on a device and/or that a device may have access to, image capture settings to be applied by a camera are typically determined based on image data that was previously captured by that same camera. In this way, the image capture settings are estimated in view of image data captured by the camera to account for the specific configuration of the camera (e.g., optics, focal distance, spatial resolution of sensor, sensor type, etc.) and the scene as viewed by the camera. For example, when a camera is initialized, the camera is powered on, and initial frames captured by the camera at the default capture settings are used to determine image capture settings for subsequent frames.

In certain environments scene conditions may change rapidly. For example, lighting conditions including lighting intensity and/or color temperature may change in between image frames that are successively captured by a single camera. Additionally, relative motion in a scene (due to camera movement and/or scene subject movement) can result in scene changes (e.g., object position changes) that are more frequent than a sampling rate of the scene that is based on a capture frame rate. In such scenes, determining image capture settings for upcoming frames based on the previously captured images from the same camera may result in inappropriate image capture settings being applied. In this way, existing techniques for determining image capture settings such as AEC, AF, and/or AWB result in a frequency responsiveness that is limited by the frame rate for the camera used to capture a scene. For example, a camera operating at a frame rate of 30 frames per second ("fps") can only make 30 AEC, AF, and/or AWB determinations or estimates per second. This means the determined image settings applied may be outdated and/or inappropriate in scenes where the conditions change more frequently than the camera frame rate (e.g., the example scene schematically illustrated in FIGS. 1A-1D) or in scenes where conditions can change abruptly or unexpectedly between frames.

Similarly, if the frame rate is being used as a sample rate to determine a scene rate of change for use in predicting scene conditions in upcoming frames, the accuracy of the sampling will be limited by the Nyquist frequency or one half of the sampling rate of the signal processing. As a result, if the rate of change of scene conditions is higher than one half of the sampling rate or frame rate, then undersampling will occur with the signal processing resulting in aliasing or predicted rate of change functions that match the received samples but that are not representative of the actual scene conditions.

When the responsiveness of a device to changes in scene conditions is less than the rate of change of one or more scene conditions, captured image frames may suffer in quality since the image capture settings applied may not be appropriate for the scene conditions at the time the frames are captured. For example, the captured image frames may be out of focus, underexposed, overexposed, and/or include color balance issues. In such situations, a preview stream relied on by a user to frame and compose a scene may exhibit undesirable effects and result in a poor user experience. Additionally, captured image frames in a video sequence may not be aesthetically pleasing to a viewer. As discussed in further detail below, aspects of the present disclosure advantageously improve camera system frequency responsiveness to changes in scene conditions by selectively utilizing captured image frames from more than one camera when determining image capture settings for one of the cameras.

Figure 4:
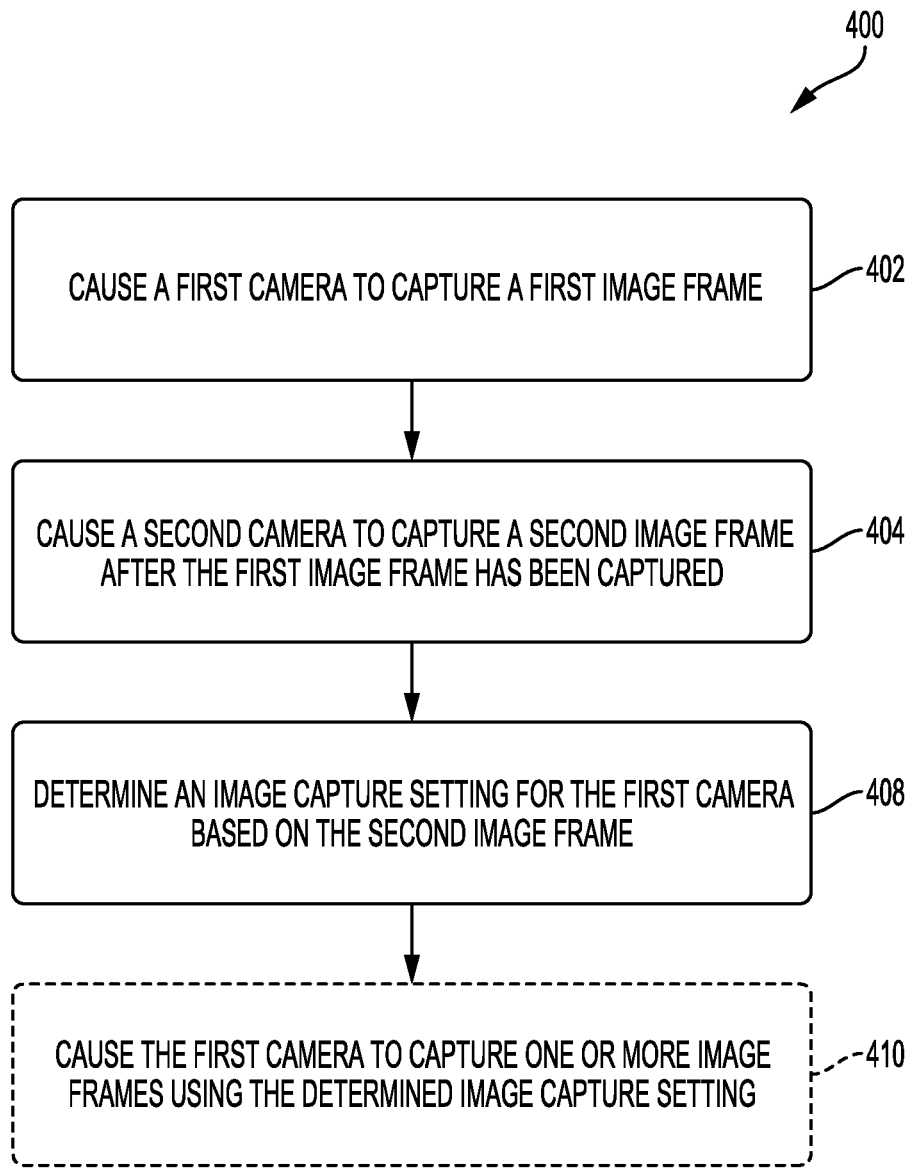
FIG. 4 is a flow chart illustrating an example operation for determining image capture settings.

FIG. 4 is an illustrative flow chart depicting an example operation 400 for capturing one or more image frames. The example operation 400 is described below with reference to the first camera 302 and the second camera 304 of device 300. Of course, it will be understood that the first camera 302 and the second camera 304 can be interchanged in the operation 400. That is, while the example operation 400 in FIG. 4 makes reference to a "first camera," the first camera 302 or the second camera 304 can perform the functions of the first camera or the second camera mentioned in the operation 400. Moreover, additional cameras (e.g., a third camera, a fourth camera, etc.) not shown in FIG. 3 can be utilized.

The operation 400 begins by causing the first camera 302 to capture a first image frame (402). In some implementations, this can be a result of a received instruction from the processor 306. For example, an instruction to capture one or more image frames (including a single image frame, a plurality of image frames, and/or a sequence of images frames or video) using the first camera can be generated based on a user input. In another example, an instruction to capture the one or more image frames can be based on an image analytics management module and/or by an application associated with the device 300. When the first camera 302 is powered down and/or in a sleep state, the camera controller 312 can optionally cause the first camera 302 to power on or otherwise have the device 300 supply power to begin initialization of the first camera 302.

In some implementations, the first camera 302 captures the first image frame using an initial image capture setting. The initial image capture setting can be a set value that is always used when initializing the first camera 302, for example, a default image capture setting may be applied to capture the first image frame. In other implementations, the initial image capture setting can be based on a previously applied image capture setting that is accessed from system memory, for example, an image capture setting used on an preceding image frame captured by the first camera 302 before the capture of the initial frame. In such implementations, the image capture setting can be determined based on the scene conditions of the preceding image frame alone or can be predictively determined based on a plurality of image frames that were captured prior to the capture of the first image frame. In other implementations, the initial image capture setting can be determined by running the first camera 302 in a high frame rate mode to recursively determine an image capture setting for the first image frame to be captured. Alternatively, the image capture setting used to capture the first image frame via the first camera 302 can be based on an image frame captured by the second camera 304 before the first camera 302 is caused to capture the first image frame.

With continued reference to FIG. 4, the operation 400 continues by causing the second camera 304 to capture a second image frame after the first image frame has been captured (404). In some implementations, the second camera 304 can run at a higher frame rate than the first camera 302. In this way, the second camera 304 can capture multiple images after the first image frame is captured and a subsequent image frame is captured by the first camera 302. In such implementations, the second image frame can be selected from any of the image frames captured after the first image frame is captured. In other implementations, the second camera 304 can run at the same frame rate than the first camera 302 with exposure periods of image frames captured by the two cameras being offset in time such that the second image frame is captured after the first image frame.

Once the second image frame is captured, the operation 400 includes determining an image capture setting for the first camera 302 based on the second image frame (408). Example aspects of an image capture setting include an AWB setting, an AF setting, and/or an AEC setting. An AEC setting may be used to control the amount of time a shutter of the first camera 302 is open (allowing light to be received by the camera sensor). Thus, in determining an AEC setting for one or more upcoming image frames, the device 300 may determine if the second image frame captured by the second camera 304 is too light or too dark (such as measuring the luminance of an image capture against one or more thresholds).

An AWB setting may be an adjustment to the color balance of an image frame (such as to prevent the colors of an image being saturated or muted). In determining an AWB setting for the image capture setting, the device 300 may determine if the colors of the second image frame are saturated or muted, for example, by measuring the color balance of at least a portion of the second image frame, which may include a blue/green color ratio and/or a red/green color ratio, against one or more thresholds. Based on this, the determination of the image capture setting can account for degrees of saturation or muting in the second image frame captured by the second camera 304.

An AF setting may adjust a focal distance of a captured image frame. For example, an AF setting may be applied to move a position of a lens to adjust an optical focus of a lens system that directs light toward an associated sensor. In some embodiments, the AF setting may determine a correct focus for a specific region of interest or subject. For example, an AF setting may be adjusted to focus an optical system on a foreground object such as a face. In this way, the image capture settings for the one or more upcoming image frames can be determined to account for the expected scene conditions (e.g., lighting and/or motion) of the scene as based on the conditions present when the second image was captured.

Still referring to the operation 400 of FIG. 4, in some implementations the image capture setting for the first camera can be based on a mapping between the first camera and the second camera. It will be understood that the first and second cameras can be differently configured so as to differ in field-of-view, optics, and/or sensor sensitivity. For example, the first and second cameras may have sensors that differ in terms of pixel size, spatial resolution, and/or vendor. As a result, determining the image capture setting for the first camera based on the second image frame captured by the second camera may require a mapping between different image capture settings that would be applied by each camera for a common scene. One example process that can be used to map image capture settings between cameras includes independently capturing a series of images on each of the first and second cameras of a common scene as light incident on the scene is adjusted, and/or as relative motion is exhibited in the scene. The image capture settings determined by each camera can be mapped based on corresponding image frames and the values can be stored in a lookup table that can be used to interpolate correspondences or the relations between the image capture settings applied by each separate camera can be theoretically modeled based on the testing samples.

In some implementations, the operation 400 can optionally include comparing a first image capture setting to be applied by the first camera based on the first image frame captured by the first camera to a second image capture setting that is based on the second image frame captured by the second camera. In some examples, if the results of the comparison indicate that the first and second image capture settings (before or after accounting for mappings between the cameras) are within a threshold range, the operation 400 may use the first image capture setting so as to reduce computational complexity in sending an additional instruction to the first camera. For example, an AEC setting may be based on an observed lux value in a previously captured image frame. If the lux value observed in the second image frame is within a threshold of the lux value observed in the first image frame, the operation 400 may apply an AEC value based on the first image frame (or based on a plurality of image frames captured before the second image frame) in capturing a subsequent frame. In some examples, this threshold may be considered as a percentage difference relative to either of the first or second image frames. For example, 5%, 10%, 15%, 20%, 25%, and so on. Additionally, comparisons between color temperature values and/or focal distance values between the first and second image frames can be considered in determining the image capture settings to be used by the first camera to capture an upcoming image frame.

With the image capture settings determined, the operation 400 can optionally include causing the first camera 302 to capture one or more image frames using the determined image capture settings (410). For example, the operation 400 can optionally include causing the first camera 302 to capture a third image frame.

Figure 5:
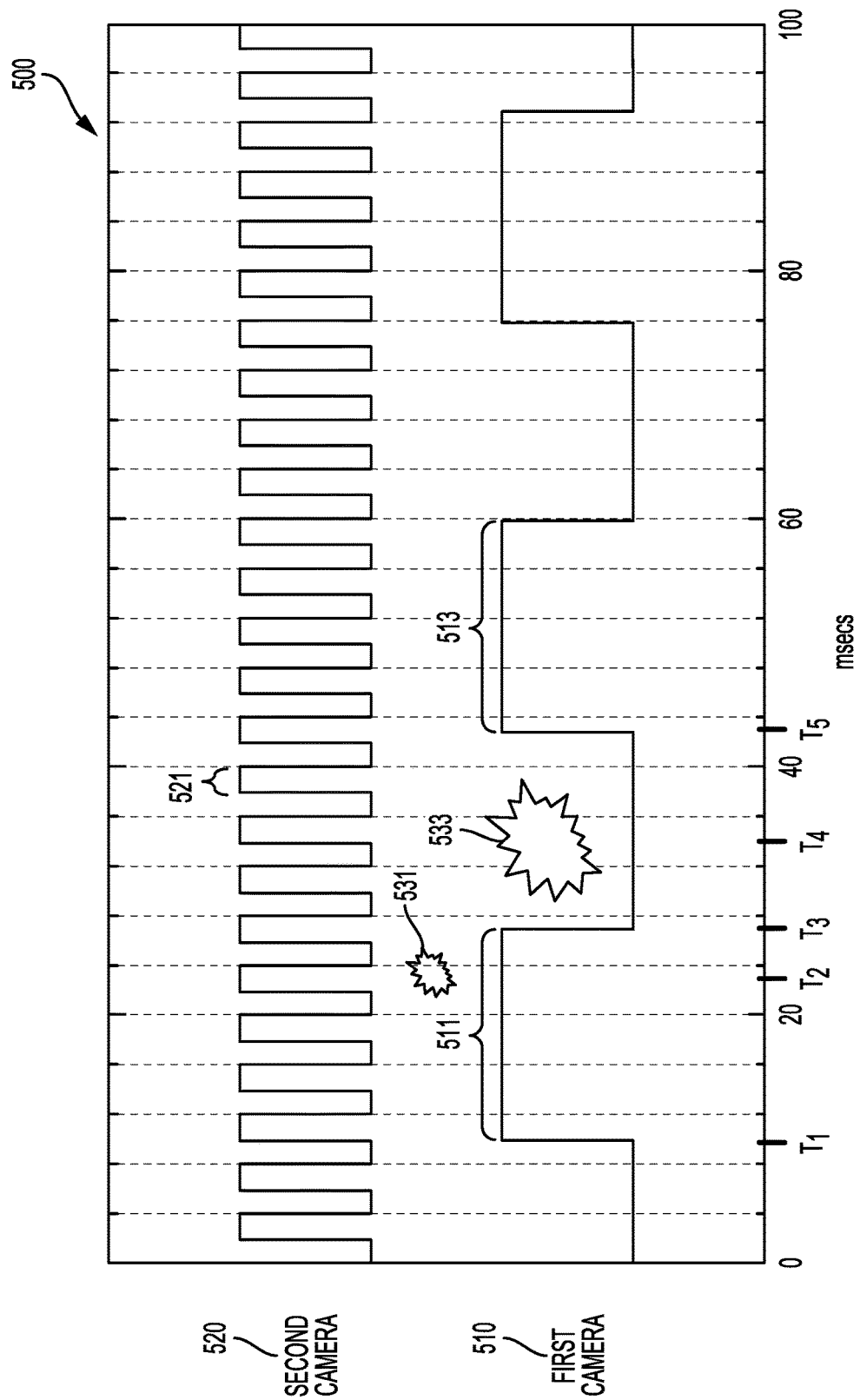
FIG. 5 is an illustrative timing diagram depicting one example operation of determining an image capture setting for a scene experiencing changes in one or more conditions.

Turning now to FIG. 5, a timing diagram 500 is schematically illustrated to depict an example operation of determining one or more image capture settings in a scene experiencing changes in conditions. As shown, the diagram 500 includes a sequence of image frames 510 for a first camera and a sequence of image frames 520 for a second camera. Referring to the sequence of image frames 510 captured by the first camera, a first image frame 511 is captured between times $T_1$ and $T_3$. That is to say, an exposure period for image frame 511 begins at time $T_1$ and ends at $T_3$, and the camera transitions at time $T_3$ from an exposure period to a recovery period until beginning a new exposure period begins at time $T_5$.

The timing diagram 500 of FIG. 5 also includes a first scene condition 531 at time $T_2$ and a second scene condition 533 at time $T_4$ that is different than the first scene condition 531. In some examples, the difference between scene conditions 531 and 533 can represent a change in lighting conditions (e.g., light intensity and/or color temperature). Additionally, or alternatively, the difference between scene conditions 531 and 533 can represent relative motion in the scene (e.g., motion of one or more objects in the scene and/or motion exhibited in the scene due to movement of the first camera). In any case, one or more scene conditions represented in diagram 500 change between time $T_2$ during the exposure period of image frame 511 and time $T_4$ during the recovery period following the capture of image frame 511.

As mentioned above, some techniques for determining image capture settings for an upcoming image frame to be captured by a first camera rely exclusively on one or more image frames previously captured by the first camera. For example, according to these techniques, image capture settings determined for an image frame 513 following the capture of the image frame 511 may be based on the conditions of the scene at the time $T_3$ that the exposure period of image frame 511 ended since the image capture settings are based on the image frame 511 alone or in conjunction with one or more image frames captured earlier by the first camera. In other cases the image capture settings determined for image frame 513, or another upcoming frame (e.g., two or more frames after image frame 511) can be based on conditions of the scene at a time between $T_1$ and $T_3$ in implementations using a rolling shutter sensor. In other cases, the image capture settings for image frame 513, or another upcoming frame (e.g., two or more frames after image frame 511) can be based on conditions of the scene at a time slightly after $T_3$ to account for some processing duration. However, since the second scene condition 533 did not appear in the scene until after the image frame 511 was captured, determining image capture settings for the image frame 513 would not be appropriate if they were based on solely on the scene conditions observed during the capture of one or more frames in the first sequence of image frames 510 (e.g., if based on the first scene condition 531 present during the capture of the image frame 511 and/or other scene conditions exhibited prior to the capture of image frame 511).

To improve the accuracy of image capture settings in scenes undergoing changes due to motion and/or lighting adjustments, some aspects of the present disclosure include capturing the sequence of image frames 520 by the second camera at a different frame rate than the sequence of image frames 510 captured by the first camera. For example, the second camera can operate at a frame rate of 240 fps with the first camera operating at a default frame rate, for example a frame rate of 30 fps. In some implementations, a default rate for the second camera can be equal to a default rate of the first camera. Those having skill in the art will understand that the second camera can operate at any frame rate that is higher than a frame rate of the first camera. In this way, the second camera can capture a second image frame 521 during the recovery period of the first camera following the capture of the first image frame 511 and also following the appearance of the second scene condition 533 at time at time $T_4$. A processor coupled to the first and second cameras can receive the second image frame 521 and calculate one or more image capture settings to be used in capturing the image frame 513 based on the second image frame 521. In this way, the image capture settings applied to capture the image frame 513 may more accurately reflect the scene conditions at time $T_5$ than if they were calculated based only on the first image frame 511 without considering the data from the second image frame 521. As discussed below, in some implementations, the second camera can be configured to operate a frame rate that is equal to or lower than a frame rate of the first camera to limit power consumption while adding additional samples to the samples captured by the first camera.

In some implementations, the sequence of image frames 520 can be used to increase an overall sampling rate used to determine a rate of change of scene conditions. For example, if the image capture settings are determined for an upcoming frame based on an expected scene condition that is predicted or estimated based on a sampling of scene conditions at a rate equal to the frame rate of the first camera, then the predicted scene condition may be an incorrect alias of the actual rate of change of the scene conditions if the scene is changing more frequently than one half of the sampling rate. However, by running the second camera at a higher frame rate, the sampling rate used to predict an upcoming scene condition can be increased to improve the accuracy of determining image capture settings. In the example, where the first camera operates at 30 fps and the second camera operates at 240 fps, the sampling rate of 240 samples per second will accurately predict scene conditions that are varying at up to a rate of 120 cycles per second. In this way, fast motion and/or rapid lighting changes can be more accurately predicted and used to determine image capture settings.

In some devices, running two or more cameras at the same time can have a considerable impact on power consumption. It such devices, it can be desirable to practice aspects of the present disclosure by selectively running two or more cameras to aid in image capture setting determination and application. For example, in one implementation, the second camera in FIG. 5 can be instructed to begin capturing the sequence of image frames 520 in response to a determination that a rate of change of scene conditions is increasing towards one half of the frame rate of the first camera. That is, since the first camera alone can sample the scene according to the operating frame rate of the first camera, the second camera can be used to aid in determining image capture settings once the predicted or estimated rate of change of one or more conditions of the scene reaches a predetermined value. For example, the predetermined value can be set relative to the operating frame rate of the first camera and/or can be represented by a threshold relative to the Nyquist limit of the operating frame rate of the first camera. In implementations where the first camera operates at a frame rate of 30 fps the predetermined value can be set so as to cause the second camera to begin capturing frames once the predicted rate of change of conditions in the scene nears or reaches 15 cycles per second. For example, the second camera can commence operation for use in aiding image capture setting determination image data from the first camera indicates that the scene is changing at a rate of 10 cycles per second, or higher.

In other implementations, to limit power consumption caused by a continuous operation of the second camera along with an operation of the first camera, the second camera can be intermittently activated to test for a rate of change of one or more scene conditions that is greater than a threshold value. For example, during operation of the first camera, the second camera can be periodically powered up to check whether the rate of change of scene conditions predicted by image frames from the first camera is accurate or whether the predicted rate of change is an alias of the actual rate of change due to an undersampling of the scene.

In other implementations, a device may include a light sensor, for example, the light sensor 206 of the device 200 in FIG. 2A. Such a light sensor may be capable of operating at a frequency that is higher than the frame rate of the first camera while consuming significantly less power than is required to operate the second camera (at any frame rate). In such implementations, the light sensor may be used to persistently or periodically sample a rate of change of lighting conditions in the scene. While such sensors may have limited resolutions, identifying changes in lighting conditions may reflect scene changes related to light intensity and/or motion. In this way, the light sensor may be used to determine whether the second camera should be operated to aid in image capture setting determination while limiting power consumption by the second camera in scenes where the frame rate of the first camera alone is sufficient to accurately determine image capture settings.

In even other implementations, the second camera can operate in response to a user input and/or an adjustment to a controlled setting. For example, a user may adjust a camera module setting and/or provide a temporary input that results in the first camera and the second camera being run together to determine image capture settings. As a result, power consumption by the second camera when aiding image capture setting determination can be enabled and disabled by a user according to desired image capture quality and potential scene conditions.

Figure 6:
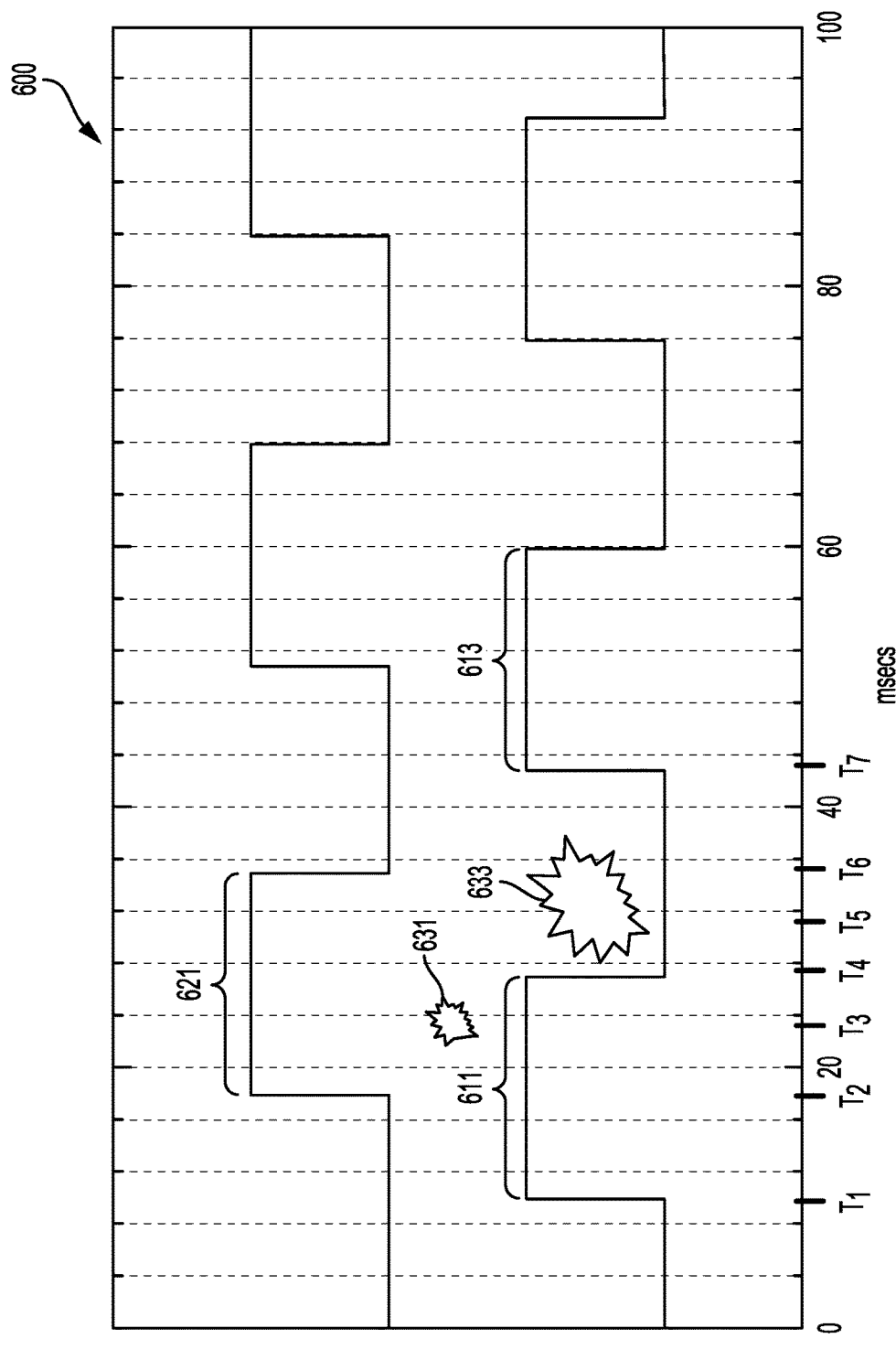
FIG. 6 is an illustrative timing diagram depicting another example operation of determining an image capture setting for a scene experiencing changes in one or more conditions.

Turning now to FIG. 6, another timing diagram 600 is schematically illustrated to depict an example operation of determining one or more image capture settings in a scene experiencing changes in conditions. As shown, the diagram 600 includes a sequence of image frames 610 for a first camera and a sequence of image frames 620 for a second camera. In contrast to the timing diagram 500 of FIG. 5, the first camera in FIG. 6 operates at a common frame rate as the second camera. However, the frames in the first sequence of image frames 610 are asynchronous with the image frames in the second sequence of image frames 620. For example, a first image frame 611 captured by the first camera is captured between times $T_1$ and $T_4$, while a second image frame 621 is captured between times $T_2$ and $T_6$. In this way, the starting and ending periods for image frames 611 and 621 do not coincide temporally. As a result, the first sequence of image frames 610 is staggered or offset from the second sequence of image frames 620. Those having skill in the art will appreciate that while the image frames in the first sequence of image frames 610 and the second sequence of image frames 620 are schematically depicted to have common exposure lengths, aspects of the present disclosure can be practiced by varying the exposure lengths of the first sequence of image frames 610 from the exposure lengths of the second sequence of image frames 610.

In some aspects of the present disclosure, the asynchronicity of the first sequence of image frames 610 relative to the second sequence of image frames 620 can be leveraged in determining one or more image capture settings to be applied by the first camera. For example, an image capture setting determined to capture image frame 613 in the first sequence of image frames 610 can be based on the second image frame 621 which concludes at time $T_6$ after the completion of the capture of the first image frame 611 at time $T_4$. Because time $T_6$ is closer in time to time $T_7$ when the exposure period for image frame 613 begins, the image capture setting responsiveness to changes in scene conditions can be improved as compared to determining image capture settings based on the first sequence of image frames 610 alone. That is, similar to the example operation depicted in FIG. 5, the sampling rate used to determine one or more image capture settings for image frame 613 can be increased by considering the image frames captured by the second camera in the second sequence of image frames 620. In this way, a change between a first scene condition 631 present at time $T_3$ and a second scene condition 633 present at time $T_5$ can be reflected in the second image frame 621 when determining one or more image capture settings to apply at time $T_7$ when exposing image frame 613.

As with the example operation discussed with reference to FIG. 5, the second camera in FIG. 6 can be selectively powered based on different factors. For example, the second camera can be operated in response to a detected rate of change of a scene condition as compared to a Nyquist limit of the sampling rate of the first camera (e.g., one half of the frame rate of the first camera). Additionally or alternatively, the second camera can be operated to capture the second sequence of image frames 620 periodically and/or intermittently to check the predicted rate of change of a scene condition using a higher sampling rate. In other implementations, a light sensor and/or user input can be used to control whether the second camera is used to aid in image capture settings applied to the first camera.

In further implementations, the frame rate of the second camera can be adjusted over time. For example, the second camera can operate continuously when the first camera operates. However, the frame rate of the second camera can be adjusted from a first rate to a second frame rate based on indications of scene changes as determined by image frames captured by the first camera, based on user input or settings, based on an indication of a change in scene conditions determined based on data received from a light sensor etc. In some implementations, the first frame rate may be a frame rate that is lower than a frame rate that the first camera is operating at. In some implementations, the second frame rate can be less than the frame rate that the first camera is operating at. In other implementations, similar to the example discussed in FIG. 5, the second frame rate can be greater than the frame rate that the first camera is operating at. In this way, the power consumed by operating the second camera concurrently with the first camera can be adjusted depending on the desired scene sampling rate and/or based on detected changes in scene conditions (e.g., frequency of lighting condition changes and/or relative motion). In other implementations, the second camera can operate at a constant frame rate as shown in FIG. 6. In such implementations, the second camera may consume less power than the first camera. For example, the spatial resolution of the second camera may be lower than a spatial resolution of the first camera.

Certain aspects and embodiments of this disclosure have been provided above. Some of these aspects and embodiments may be applied independently and some of them may be applied in combination as would be apparent to those of skill in the art. In the foregoing description, for the purposes of explanation, specific details are set forth in order to provide a thorough understanding of embodiments of the invention. However, it will be apparent that various embodiments may be practiced without these specific details. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Moreover, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Further, the various illustrative logical blocks, modules, circuits, and algorithm steps described in connection with the embodiments disclosed herein may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device comprising:
a processor coupled to a first camera and a second camera, the processor configured to:
cause the first camera to capture a first image frame;
cause the second camera to capture a second image frame, the second image frame being captured after the first image frame; and
determine an image capture setting for the first camera based on the second image frame and a mapping between an image capture setting for the second camera and an image capture setting for the first camera.

2. The device of claim 1, wherein the processor is further configured to:
cause the first camera to capture one or more image frames including the first image frame at a first frame rate; and
cause the second camera to capture one or more image frames including the second image frame at a second frame rate.

3. The device of claim 2, wherein the first frame rate is equal to the second frame rate.

4. The device of claim 2, wherein the second frame rate is greater than the first frame rate.

5. The device of claim 2, wherein the processor is further configured to adjust the second frame rate based on an estimated rate of change of one or more scene conditions.

6. The device of claim 1, wherein the processor is further configured to cause the first camera to capture a third image frame based on the determined image capture setting.

7. The device of claim 6, wherein the determined image capture setting comprises at least one of the group consisting of: an exposure control setting, a white balance setting, and a focal distance setting.

8. The device of claim 1, further comprising:
the first camera; and
the second camera.

9. The device of claim 1, wherein the processor is further configured to: cause the second camera to capture the second image frame in response to a detected change in one or more scene conditions.

10. The device of claim 9, wherein processor is further configured to detect the change in one or more scene conditions based on two or more image frames captured by the first camera.

11. The device of claim 1, wherein the processor is further configured to compare the first image frame to the second image frame and determine the image capture setting in response to a difference between the first image frame and the second image frame exceeding a threshold value.

12. The device of claim 1, wherein the processor is further configured to estimate a rate of change of one or more scene conditions based on the first image frame and the second image frame.

13. The device of claim 12, wherein the processor is configured to determine the image capture setting determined for the first camera based on the estimated rate of change.

14. The device of claim 1, wherein the processor is configured to determine the image capture setting determined for the first camera based on the first image frame and the second image frame.

15. A method comprising:
causing a first camera to capture a first image frame;
causing a second camera to capture a second image frame, the second image frame being captured after the first image frame; and
determining an image capture setting for the first camera based on the second image frame and a mapping between an image capture setting for the second camera and an image capture setting for the first camera.

16. The method of claim 15, further comprising:
causing the first camera to capture one or more image frames including the first image frame at a first frame rate; and
causing the second camera to capture one or more image frames including the second image frame at a second frame rate.

17. The method of claim 16, wherein the first frame rate is equal to the second frame rate.

18. The method of claim 16, wherein the second frame rate is greater than the first frame rate.

19. The method of claim 16, further comprising:
estimating a rate of change of one or more scene conditions; and
adjusting the second frame rate based the estimated rate of change.

20. The method of claim 15, further comprising causing the first camera to capture a third image frame based on the determined image capture setting.

21. The method of claim 20, wherein the determined image capture setting comprises at least one of the group consisting of: an exposure control setting, a white balance setting, and a focal distance setting.

22. The method of claim 15, further comprising causing the second camera to capture the second image frame in response to a detected change in one or more scene conditions.

23. The method of claim 22, further comprising determining the detected change based on two or more image frames captured by the first camera.

24. The method of claim 15, further comprising comparing the first image frame to the second image frame and determining the image capture setting based on the second image frame in response to a difference between the first image frame and the second image frame exceeding a threshold value.

25. The method of claim 15, further comprising estimating a rate of change of one or more scene conditions based on the first image frame and the second image frame.

26. The method of claim 25, wherein determining the image capture setting for the first camera is based on the estimated rate of change.

27. The method of claim 15, wherein determining the image capture setting for the first camera is based on the first image frame and the second image frame.

28. A non-transitory computer-readable storage medium storing instructions thereon that when executed cause one or more processors to:
   cause a first camera to capture a first image frame;
   cause a second camera to capture a second image frame, the second image frame being captured after the first image frame; and
   determine an image capture setting for the first camera based on the second image frame and a mapping between an image capture setting for the second camera and an image capture setting for the first camera.

\* \* \* \* \*